(12) United States Patent
Park et al.

(10) Patent No.: US 12,460,775 B2
(45) Date of Patent: Nov. 4, 2025

(54) HYDROGEN STORAGE SYSTEM

(71) Applicants: HYUNDAI MOTOR COMPANY, Seoul (KR); KIA CORPORATION, Seoul (KR)

(72) Inventors: Ji Hye Park, Seoul (KR); Won Jung Kim, Seoul (KR); Kyung Moon Lee, Uiwang-si (KR); Dong Hoon Nam, Suwon-si (KR); Young Jin Cho, Gimhae-si (KR); Byeong Soo Shin, Uiwang-si (KR); Ji Hoon Lee, Uiwang-si (KR); Suk Hoon Hong, Seoul (KR); Hoon Mo Park, Seongnam-si (KR); Yong Doo Son, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 315 days.

(21) Appl. No.: 18/120,164

(22) Filed: Mar. 10, 2023

(65) Prior Publication Data

US 2024/0117941 A1 Apr. 11, 2024

(30) Foreign Application Priority Data

Oct. 11, 2022 (KR) ........................ 10-2022-0129869

(51) Int. Cl.
*F17C 11/00* (2006.01)
(52) U.S. Cl.
CPC .... *F17C 11/005* (2013.01); *F17C 2205/0142* (2013.01); *F17C 2221/012* (2013.01)

(58) Field of Classification Search
CPC ............ F17C 11/005; F17C 2205/0142; F17C 2221/012
(Continued)

(56) References Cited

U.S. PATENT DOCUMENTS 4,446,111 A * 5/1984 Halene ................. C01B 3/0005
422/243
4,522,159 A * 6/1985 Engel ................... F02M 21/029
48/190

(Continued)

FOREIGN PATENT DOCUMENTS

JP H05256399 A 10/1993
JP 2003254499 A 9/2003
(Continued)

OTHER PUBLICATIONS

Office Action cited in the U.S. Appl. No. 18/119,914; Nov. 18, 2024; 9 pp.
(Continued)

*Primary Examiner* — Jacob K Ackun
(74) *Attorney, Agent, or Firm* — Lempia Summerfield Katz LLC (57) ABSTRACT

A hydrogen storage system is disclosed and includes a storage unit including a plurality of unit storage containers, in which metal hydride materials are respectively provided in an interior thereof and which are connected to each other in parallel, and a thermal fluid line defining a thermal fluid passage, which passes via the plurality of unit storage containers continuously and through which a thermal fluid flows for heating or cooling the unit storage containers, thereby enhancing a storage performance and an efficiency of the hydrogen.

10 Claims, 5 Drawing Sheets

(58) Field of Classification Search
USPC .......................................................... 206/0.7
See application file for complete search history.

(56) References Cited

U.S. PATENT DOCUMENTS

| | | | | |
|---|---|---|---|---|
| 4,523,548 | A * | 6/1985 | Engel | F17C 13/084 |
| | | | | 48/190 |
| 4,609,038 | A * | 9/1986 | Ishikawa | F28D 20/003 |
| | | | | 165/104.12 |
| 4,667,815 | A | 5/1987 | Halene | |
| 5,953,922 | A | 9/1999 | Stetson | |
| 6,015,041 | A * | 1/2000 | Heung | C01B 3/0005 |
| | | | | 423/658.2 |
| 7,112,239 | B2 | 9/2006 | Kimbara et al. | |
| 7,637,292 | B2 | 12/2009 | Handa | |
| 7,850,034 | B2 | 12/2010 | Munshi | |
| 7,870,878 | B2 | 1/2011 | Zhevago et al. | |
| 8,281,820 | B2 | 10/2012 | White | |
| 8,287,629 | B2 | 10/2012 | Fujita et al. | |
| 8,430,237 | B2 | 4/2013 | Westenberger | |
| 8,607,830 | B2 | 12/2013 | White | |
| 8,940,083 | B2 | 1/2015 | De Rango | |
| 8,985,319 | B2 | 3/2015 | Chaise | |
| 9,033,178 | B2 | 5/2015 | White | |
| 9,169,976 | B2 | 10/2015 | Peterson | |
| 10,829,370 | B2 | 11/2020 | Collins | |
| 11,761,713 | B2 * | 9/2023 | Park | F28F 1/325 |
| | | | | 96/108 |
| 2004/0074144 | A1 | 4/2004 | Isogai et al. | |
| 2005/0000234 | A1 | 1/2005 | Kimbara et al. | |
| 2007/0000561 | A1 | 1/2007 | Handa | |
| 2008/0209916 | A1 | 9/2008 | White | |
| 2008/0209918 | A1 | 9/2008 | White | |
| 2009/0078909 | A1 | 3/2009 | Yagi et al. | |
| 2009/0120811 | A1 | 5/2009 | Zhevago et al. | |
| 2010/0024542 | A1 * | 2/2010 | Yen | F17C 11/005 |
| | | | | 73/290 R |
| 2010/0219087 | A1 | 9/2010 | Fujita et al. | |
| 2012/0222971 | A1 * | 9/2012 | Gillia | C01B 3/0005 |
| | | | | 53/467 |
| 2012/0222972 | A1 * | 9/2012 | Chaise | C01B 3/0042 |
| | | | | 137/15.01 |
| 2013/0056111 | A1 | 3/2013 | White | |
| 2013/0175006 | A1 * | 7/2013 | Robinson | F28D 20/003 |
| | | | | 222/3 |
| 2016/0185210 | A1 * | 6/2016 | Lee | B60K 15/063 |
| | | | | 180/69.5 |
| 2019/0273271 | A1 | 9/2019 | Inagaki | |

FOREIGN PATENT DOCUMENTS

| | | |
|---|---|---|
| JP | 2004060815 A | 2/2004 |
| JP | 2005063703 A | 3/2005 |
| JP | 2007333158 A | 12/2007 |
| JP | 4119304 B2 | 5/2008 |
| JP | 2008303955 A | 12/2008 |
| JP | 2010202470 A | 9/2010 |
| JP | 5221715 B2 | 3/2013 |
| JP | 2015096745 A | 5/2015 |
| KR | 20090125265 A | 12/2009 |
| KR | 101185175 B1 | 9/2012 |
| KR | 20170131038 A | 11/2017 |
| WO | 2006120808 A1 | 11/2006 |

OTHER PUBLICATIONS

GKN Hydrogen chosen for US Department of Energy hydrogen storage project, GKN Hydrogen, 3 pages, https://www.pm-review.com/gkn-hydrogen-chosen-for-us-department of energy-hydrogen-storage-project/; Oct. 15, 2021.

Hydrogen Storage Tank for Renewable Energy, Japan Steel Works M&E, Inc., 1 page, https://www.jsw-me.com/en/products/04.html; 2021.

Hydrogen Storage Using Metal Hydrides, Guidehouse Insights, Sep. 21, 2021, 3 pages, https://guidehouseinsights.com/news-and-views/hydrogen-storage-using-metal-hydrides.

Ismail Hilali et al., An experimental study to validate optimum distance between metal hydride tanks with staggered arrangement for effective thermal management, International Journal of Hydrogen Energy, vol. 47, Issue 45, Mar. 20, 2022, pp. 19732-19740, https://doi.org/10.1016/j.ijhydene.2022.03.201.

Mykhaylo V. Lototskyy et al., Metal hydride hydrogen storage and supply systems for electric forklift with low-temperature proton exchange membrane fuel cell power module, International Journal of Hydrogen Energy; vol. 41, Issue 31, Aug. 17, 2016, pp. 13831-13842.

Office Action cited in the U.S. Appl. No. 18/119,914; May 31, 2024; 8 pp.

* cited by examiner

HYDROGEN STORAGE SYSTEM

CROSS-REFERENCE TO RELATED APPLICATION

This application claims the benefit of priority to Korean Patent Application No. 10-2022-0129869, filed in the Korean Intellectual Property Office on Oct. 11, 2022, the entire contents of which are incorporated herein by reference.

TECHNICAL FIELD

The present disclosure relates to a hydrogen storage system, and more particularly, to a hydrogen storage system that may enhance a storage performance and efficiency while securing a storage capacity of hydrogen.

BACKGROUND

Because hydrogen is in a gaseous state at room temperature and atmospheric pressure, it is stored in a high-pressure gas or liquid hydrogen state or is stored in a form, in which it is chemically bonded to a solid-state/liquid-state material to increase energy density. According to the high-pressure gas storage scheme, hydrogen may be changed due to a physical pressure difference and may be stored easily and rapidly, and a weight storage density thereof increases as it is compressed at a high pressure, and thus it is used for mobility most widely. However, it has a low storage density per volume and there is a limit in further increasing the pressure to increase the storage capacity. Because the liquefied hydrogen has a high energy density per volume but requires high energy to be liquefied into a cryogenic state, and 2% to 3% thereof is evaporated and lost per day, an insulation technology for a container is very important. According to the liquefied hydrogen storage scheme, loss due to boil-off increases as a specific surface area of the container increases so that it is disadvantageous in small capacity storage and is not efficient as a long-time storage scheme.

According to a scheme of chemically bonding hydrogen to a solid-state or liquid-state material to store it, because hydrogen may be stored at a temperature and a pressure that are close to room temperature and atmospheric pressure whereby it is safer than the high pressure gas scheme and it is possible to store hydrogen more stably and for a longer time than the liquefied hydrogen storage scheme. Furthermore, a storage density of the hydrogen may be increased by introducing lower energy than in the scheme of compressing the hydrogen at a high pressure or cooling the hydrogen into a cryogenic state.

In particular, according to the solid hydrogen storage scheme, a spatial utility may be increased because a storage density per unit volume is high, and because hydrogen in a solid storage material is discharged to an outside only when it reaches a specific temperature condition, it is very safe and is advantageous in storing the hydrogen for a long time. When this kind of advantage is applied to a hydrogen-energy storage system (H-ESS), it is possible to store regenerative energy having severe changes according to the weather and seasons stably for a long time according to the weather and seasons.

In recent years, attempts to store a high capacity of hydrogen in a solid hydrogen storage scheme have been made. As an example, as a generation quantity through regenerative energy sources, such as the sunlight or wind power has increased, a need for a method for stably storing a large capacity of energy also has increased.

It may be considered that a size of a storage container, in which the metal hydride material is stored, should be increased to increase an amount of stored hydrogen in a solid hydrogen storage scheme, but when the size of the storage container increases by a specific value or more, it is difficult to uniformly control a temperature of the metal hydride material accommodated in the storage container as a whole (a deviation between temperatures of areas of the metal hydride material occurs) whereby a storage performance and an efficiency of the hydrogen rather deteriorates.

SUMMARY

The present disclosure has been made to solve the above-mentioned problems occurring in the prior art while advantages achieved by the prior art are maintained intact.

An aspect of the present disclosure provides a hydrogen storage system that may enhance a storage performance and an efficiency of hydrogen of a high capacity while storing the hydrogen in a solid hydrogen storage scheme.

In particular, an objective of an embodiment of the present disclosure is to enhance the storage performance and the efficiency of the hydrogen by connecting a plurality of unit storage containers.

Furthermore, an objective of an embodiment of the present disclosure is to minimize a load of a pump for supplying a thermal fluid used for heating and cooling the unit storage containers and minimize power consumptions.

Most of all, an objective of the present disclosure is to cause the thermal fluid supplied along a thermal fluid line to drop and flow due to a gravitational force.

Furthermore, an objective of an embodiment of the present disclosure is to enhance heat exchange efficiency by the thermal fluid and minimize deviations of temperatures for heating and cooling the unit storage containers.

Furthermore, an objective of an embodiment of the present disclosure is to minimize heat loss of the thermal fluid, shorten a time period that is consumed for heating and cooling the unit storage containers, and enhance energy efficiency.

The technical problems to be solved by the present disclosure are not limited to the aforementioned problems, and any other technical problems not mentioned herein should be clearly understood from the following description by those having ordinary skill in the art to which the present disclosure pertains.

According to an embodiment for achieving the above-described objectives of the present disclosure, a hydrogen storage system includes a storage unit including a plurality of unit storage containers, in which metal hydride materials are respectively provided in an interior thereof and which are connected to each other in parallel. The hydrogen storage system also includes a thermal fluid line defining a thermal fluid passage, which passes via the plurality of unit storage containers continuously and through which a thermal fluid flows for heating or cooling the unit storage containers.

This is for enhancing a storage performance and an efficiency of hydrogen of a high capacity while storing the hydrogen in a solid hydrogen storage scheme.

In other words, it may be considered that a size of a storage container, in which the metal hydride material is stored, should be increased to increase an amount of stored hydrogen in a solid hydrogen storage scheme, but when the size of the storage container increases by a specific value or more, it is difficult to uniformly control a temperature of the metal hydride material accommodated in the storage container as a whole (a deviation between temperatures of areas of the metal hydride material occurs), thereby deteriorating a storage performance and an efficiency of the hydrogen.

However, according to an embodiment of the present disclosure, a storage performance and an efficiency of hydrogen of a high capacity may be enhanced while the hydrogen is stored in a solid hydrogen storage scheme, by connecting a plurality of unit storage containers in parallel (i.e., connecting the plurality of unit storage containers having a size, by which a temperature of the metal hydride material may be uniformly controlled, in parallel).

Most of all, according to an embodiment of the present disclosure, a structure and a process for cooling or heating the plurality of unit storage containers may be simplified by causing a thermal fluid line that continuously passes via the plurality of unit storage containers to continuously cool or heat the plurality of unit storage containers.

The number and disposition of structures of the unit storage containers that constitute the storage unit may be variously changed according to a condition and a design specification that are required.

According to an embodiment of the present disclosure, the storage unit may include a first unit storage container of the plurality of unit storage containers, in which one of the metal hydride materials is accommodated in an interior thereof. The storage unit may also include a second unit storage container of the plurality of unit storage containers, in which another one of the metal hydride materials is accommodated in an interior thereof, where the second unit storage container is provided on a lower side of the first unit storage container along a gravitational direction.

The thermal fluid line may have various structures that may exchange heat with the unit storage containers (i.e., a first unit storage container and a second unit storage container).

According to an embodiment of the present disclosure, the thermal fluid line may include a first line that passes via the first unit storage container, a second line that passes via the second unit storage container, and a connection line continuously connecting the first line and the second line.

According to an embodiment of the present disclosure, the first line may be provided along a lengthwise direction of the first unit storage container, and may have a helical shape, and the second line may be provided along a lengthwise direction of the second unit storage container, and may also have a helical shape.

According to an embodiment of the present disclosure, the connection line may be disposed along the gravitational direction, and the thermal fluid may drop and flow due to a gravitational force in the connection line.

In this way, in an embodiment of the present disclosure, by disposing the connection line along the gravitational direction and causing the thermal fluid to flow due to the gravitational force, a load of a pump that provides a pumping force for flows of the thermal fluid may be minimized and power consumptions due to an operation of the pump may be minimized.

Furthermore, according to an embodiment of the present disclosure, because flows of the thermal fluid may be secured even through a separate pump is not provided on the thermal fluid line, it is possible to exclude the pump from the thermal fluid line. Accordingly, when the pump is excluded, the structure may be simplified and a degree of freedom of design and a spatial utility thereof may be enhanced.

According to an embodiment of the present disclosure, the first unit storage container and the second unit storage container may be adhered to each other.

In this way, in an embodiment of the present disclosure, a degree of freedom of design and a spatial utility thereof may be enhanced by adhering the first unit storage container and the second unit storage container.

In addition, in an embodiment of the present disclosure, because exposure of the connection line to an outside may be minimized by adhering the first unit storage container and the second unit storage container, heat loss and a temperature deviation of the thermal fluid due to exposure of the connection line may be minimized.

According to an embodiment of the present disclosure, the plurality of unit storage containers that constitute the storage unit may store (or discharge) the hydrogen at different temperatures.

According to an embodiment of the present disclosure, the first unit storage container may store the hydrogen in a first temperature range, and the second unit storage container may store the hydrogen in a second temperature range that is lower than the first temperature range.

This is caused by an aspect that the thermal fluid supplied to the second unit storage container has a temperature that is lower than that of the thermal fluid supplied to the first unit storage container as the thermal fluid is supplied to the second unit storage container after passing via (exchanging heat with) the first unit storage container. Deviations between hydrogen storage performances and efficiencies of the first unit storage container and the second unit storage container may be minimized by causing the second unit storage container to store (or discharge) the hydrogen in the second temperature range that is lower than an operation temperature (the first temperature range) of the first unit storage container.

According to an embodiment of the present disclosure, the first line and the second line that constitute a thermal fluid line may have different passage cross-sectional areas.

As an example, the first line may have a first passage cross-sectional area, and the second line may have a second passage cross-sectional area that is smaller than the first passage cross-sectional area.

This is caused by an aspect that the thermal fluid supplied to the second unit storage container has a temperature that is lower than that of the thermal fluid supplied to the first unit storage container as the thermal fluid is supplied to the second unit storage container after passing via (exchanging heat with) the first unit storage container, and because a flow velocity of the thermal fluid that passes through the second line may be increased by causing the second line to have the second cross-sectional area that is smaller than the first passage cross-sectional area, the heat exchange effect by the thermal fluid may be enhanced whereby the deviations between the hydrogen storage performances and efficiencies of the first unit storage container and the second unit storage container may be obtained.

According to an embodiment of the present disclosure, the hydrogen storage system may include a thermal fluid characteristic control part connected to the thermal fluid line and that selectively controls at least any one of a temperature and a flow velocity of the thermal fluid.

The thermal fluid characteristic control part may have various structures that may selectively control a temperature and a flow velocity of the thermal fluid that flows along the thermal fluid line.

According to an embodiment of the present disclosure, the thermal fluid characteristic control part may include a bypass line connected to the connection line, and a control part provided in the bypass line that controls at least any one of the temperature or the flow velocity of the thermal fluid.

This is caused by an aspect that the thermal fluid supplied to the second unit storage container has a temperature that is lower than that of the thermal fluid supplied to the first unit storage container as the thermal fluid is supplied to the second unit storage container after passing via (exchanging heat with) the first unit storage container, and because a temperature deviation (or a flow velocity deviation) of the thermal fluid supplied to the first unit storage container and the thermal fluid supplied to the second unit storage container may be minimized by causing the thermal fluid that passed through the first unit storage container is supplied to the second unit storage container after being heated by the thermal fluid characteristic control part (or after the flow velocity thereof is increased) whereby deviations between the hydrogen storage performances and the efficiencies of the first unit storage container and the second unit storage container may be minimized.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, embodiments of the present disclosure are described in detail with reference to the accompanying drawings.

However, the technical spirits of the present disclosure are not limited to some embodiments but may be implemented in various different forms, and one or more of the components of the embodiments may be selectively coupled or replaced to be used without departing from the technical spirits of the present disclosure.

Furthermore, the terms (including technical and scientific terms) used in the embodiments of the present disclosure may be construed as meanings that may be generally understood by a person having ordinary skill in the art, to which the present disclosure pertains, unless explicitly particularly defined and described, and the meanings of the terms, such as the terms defined in dictionaries, which are generally used may be construed in consideration of the contextual meanings of the related technologies.

In addition, the terms used in the embodiments of the present disclosure are for describing the embodiments, and are not intended to limit the present disclosure.

In the specification, a singular form may include a plural form unless particularly mentioned, and may include one or more of all combinations that may be made by "A", "B", and "C", when at least one (or one or more) of "A", "B", and "C" is described.

In addition, terms, such as first, second, "A", "B", (a), (b) or the like may be used herein when describing components of the present disclosure.

The terms are provided only to distinguish the components from other components, and the essences, sequences, orders, and the like of the components are not limited by the terms.

Furthermore, when it is described that a component is 'connected', 'coupled', or 'electrically connected' to another component, it may include not only the case, in which the former may be directly connected, coupled, or electrically connected to the latter, but also the case, in which the former is 'connected', 'coupled', or 'electrically connected' to the latter via another component therebetween.

In addition, when it is described that a component is formed or disposed "on an upper side of (above or on)" or "on a lower side of (below or under)" another component, it may include not only the case, in which the two components directly contact each other, but also the case, in which one or more third components are formed or disposed between the two components. Further, "on an upper side of (above or on)" or "on a lower side of (below or under)" may mean that an element may be arranged on the lower side of as well as on the upper side of the latter.

Referring to FIGS. 1-5, a hydrogen storage system 10 according to an embodiment of the present disclosure includes a storage unit 100 including a plurality of unit storage containers 110, 120, 130, 140, and 150, in which metal hydride materials are respectively provided in an interior thereof and which are connected to each other in parallel; and a thermal fluid line 200 defining a thermal fluid passage, which passes via the plurality of unit storage containers 110, 120, 130, 140, and 150 continuously, and through which a thermal fluid flows for heating or cooling the unit storage containers.

For reference, the hydrogen storage system 10 according to the present disclosure may be used to treat (store and discharge) the required hydrogen, and the present disclosure is neither limited nor restricted by the characteristics and states of the hydrogen treated by the hydrogen storage system 10.

As an example, the hydrogen storage system 10 according to an embodiment of the present disclosure may be used to store hydrogen produced by a hydrogen production facility before the hydrogen is supplied to the source of demand. According to another embodiment of the present disclosure, it is possible to use the hydrogen storage system according to the present disclosure to restore the hydrogen compressed once in advance.

Figure 1:
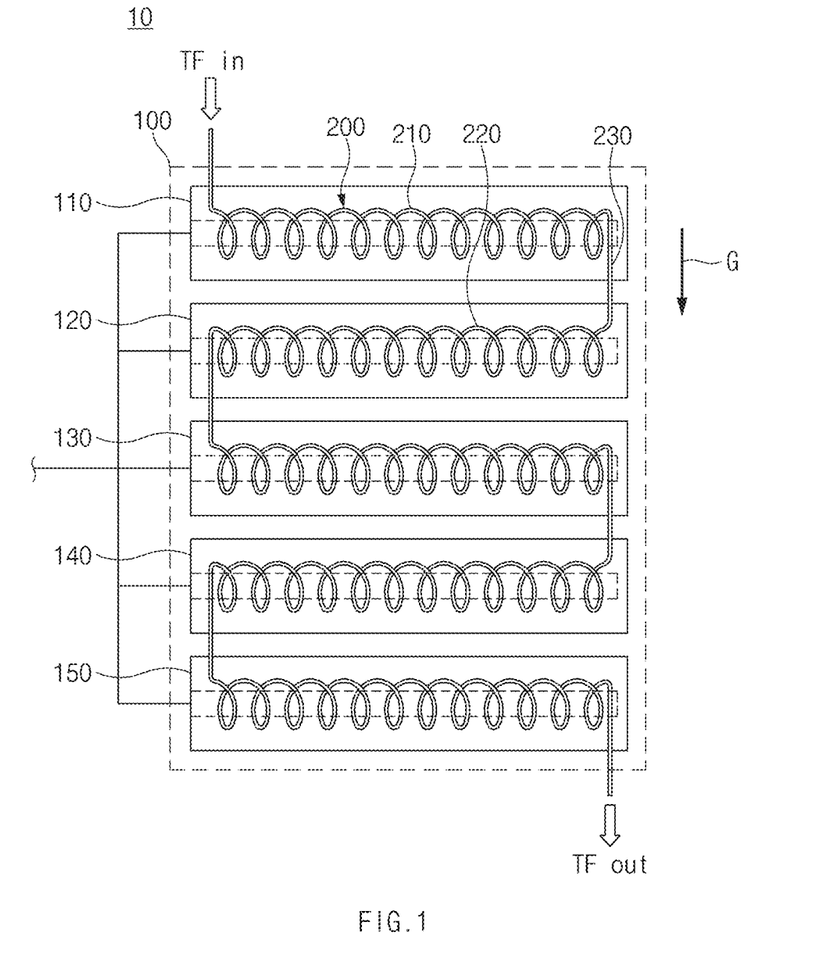
FIGS. 1 and 2 are views illustrating a hydrogen storage system according to an embodiment of the present disclosure.
Figure 2:
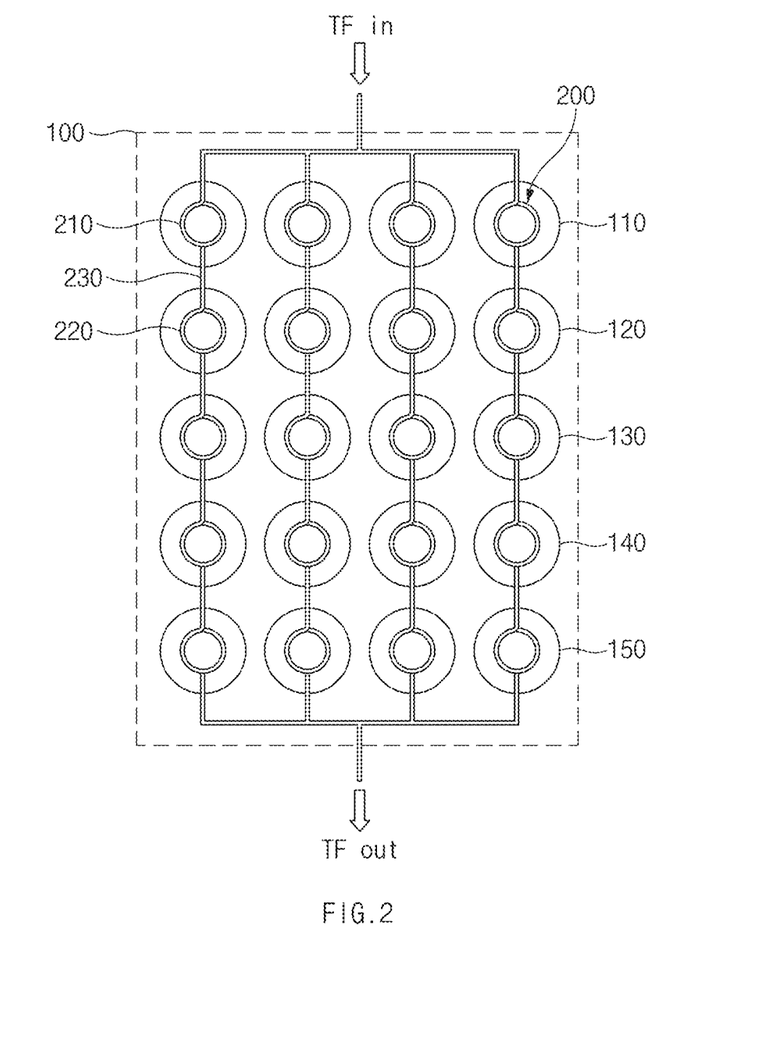

Referring to FIGS. 1 and 2, the storage unit 100 includes the plurality of unit storage containers 110, 120, 130, 140, and 150, in which the metal hydride materials are respectively provided in the interior thereof and which are connected to each other in parallel. The hydrogen may be stored and discharged through a repeated process of heating and cooling.

As an example, the plurality of unit storage containers 110, 120, 130, 140, and 150 may be configured to store (or discharge) the hydrogen at the same temperature.

For reference, the number and disposition of structures of the unit storage containers that constitute the storage unit 100 may be various changed according to a condition or a design specification that are required, and the present disclosure is neither limited nor restricted by the number and the disposition of structures of the unit storage containers.

Hereinafter, an example, in which the plurality of unit storage containers 110, 120, 130, 140, and 150 that constitute the storage unit 100 are connected to each other in parallel to form a 4×5 matrix (or a 5×4 matrix) are described (with reference to FIG. 2).

In more detail, the storage unit 100 may include the first unit storage container 110, in which a metal hydride material is accommodated in an interior thereof, the second unit storage container 120, in which a metal hydride material is accommodated in an interior thereof and which is provided on a lower side of the first unit storage container 110 along a gravitational direction "G" (an upward/downward direction), the third unit storage container 130, in which a metal hydride material is accommodated in an interior thereof and which is provided on a lower side of the second unit storage container 120 along the gravitational direction "G" (the upward/downward direction), the fourth unit storage container 140, in which a metal hydride material is accommodated in an interior thereof and which is provided on a lower side of the third unit storage container 130 along the gravitational direction "G" (the upward/downward direction), and the fifth unit storage container 150, in which a metal hydride material is accommodated in an interior thereof and which is provided on a lower side of the fourth unit storage container 140 along the gravitational direction "G" (the upward/downward direction). Four of each of the unit storage containers (the first unit storage container 110, the second unit storage container 120, the third unit storage container 130, the fourth unit storage container 140, and the fifth unit storage container 150) are respectively provided to be spaced apart from each other at a specific interval along a horizontal direction (a transverse direction with reference to FIG. 2).

According to another embodiment of the present disclosure, the plurality of unit storage containers that constitute the storage unit may be arranged to form a one-dimensional matrix (1×n matrix) or other two-dimensional matrix along the upward/downward direction.

The unit storage containers (the first unit storage container 110, the second unit storage container 120, the third unit storage container 130, the fourth unit storage container 140, and the fifth unit storage container 150) are storage containers based on a solid hydrogen storage scheme, and the hydrogen may be stored and discharged through a repeated process of heating and cooling by using the characteristics of the metal hydride materials.

The unit storage containers (the first unit storage container 110, the second unit storage container 120, the third unit storage container 130, the fourth unit storage container 140, and the fifth unit storage container 150) may be provided in various structures and shapes each having a storage space in an interior thereof, and the present disclosure is neither limited nor restricted by the structure and shapes of the unit storage containers.

As an example, each of the unit storage containers may have a hollow cylindrical shape having a circular cross-section. According to another embodiment of the present disclosure, each of the unit storage containers may have a polygonal (for example, rectangular) cross-section or other cross-sectional shapes.

An inlet/outlet port (not illustrated), through which the hydrogen is introduced and discharged, may be provided at one end (for example, a left end of FIG. 1) of the unit storage containers.

In this example, introducing and discharging the hydrogen through the inlet/outlet port is defined to include both supplying the hydrogen into an interior of the unit storage containers from an outside of the unit storage containers or discharging the hydrogen to an outside of the unit storage containers from the interior of the unit storage containers.

The inlet/outlet port may have various structures, through which the hydrogen may be introduced and discharged, and the present disclosure is neither limited nor restricted by the structure and form of the inlet/outlet port. For reference, although it is described in an embodiment of the present disclosure that only one inlet/outlet port is provided in the unit storage containers, a plurality of inlet/outlet ports may be provided in the unit storage containers according to another embodiment of the present disclosure. Alternatively, it is possible to form the plurality of inlet/outlet ports at a portion (for example, a central portion) other than an end of the unit storage containers.

Furthermore, various additional devices, such as a valve (not illustrated) for adjusting an amount of the hydrogen that is introduced into and discharged from the unit storage containers and a safety device (for example, a rupture disk) (not illustrated) for compulsorily discharging the hydrogen when an internal pressure of the unit storage containers is excessively increased, may be provided in the inlet/outlet port of the unit storage containers, and the present disclosure is neither limited nor restricted by the kinds and structures of the additional devices.

The metal hydride material is accommodated (filled) in the interiors of the unit storage containers (the first unit storage container 110, the second unit storage container 120, the third unit storage container 130, the fourth unit storage container 140, and the fifth unit storage container 150), and the metal hydride material may store and discharge the hydrogen through a repeated process of heating and cooling.

In other words, when energy, such as heat, is applied to the metal hydride material, the metal hydride material may be decomposed into metal elements and hydrogen and then the hydrogen may be discharged. When the hydrogen is compressed at a proper temperature, the metal elements and the hydrogen may be synthesized into the metal hydride material again and then the hydrogen may be stored.

Various materials that may store and discharge the hydrogen through a repeated process of heating and cooling may be used as the metal hydride material, and the present disclosure is neither limited nor restricted by the kind and characteristics of the metal hydride material.

As an example, the metal hydride material may include at least any one of an AB5-based alloy, an AB2-based alloy, and an AB-based alloy. For example, the metal hydride material may be an alloy, the main elements of which are $LaNi_5$, TiFe, and $TiMn_2$.

For reference, the metal hydride material may be accommodated in the interiors of the unit storage containers in a form of powder or pellets, and the present disclosure is neither limited nor restricted by the accommodation state and the form of the metal hydride material. According to another embodiment of the present disclosure, it is possible for the metal hydride material to have a bulk shape corresponding to the unit storage containers by pressing metal hydride powder or metal hydride pellets.

The thermal fluid line 200 defines a thermal fluid passage, which continuously passes via the plurality of unit storage containers 110, 120, 130, 140, and 150 and through which the thermal fluid flows for heating or cooling the unit storage containers.

A general heat medium or a general cooling medium that may exchange heat with the metal hydride material of the unit storage containers may be used as the thermal fluid (TF) that is supplied along the thermal fluid line 200, and the present disclosure is neither limited nor restricted by the kind and the characteristics of the thermal fluid.

In an embodiment of the present disclosure, an aspect that the thermal fluid line 200 continuously passes via the plurality of unit storage containers 110, 120, 130, 140, and 150 is defined to include that the thermal fluid line 200 passes through the interiors of the unit storage containers or contacts outer surfaces of the unit storage containers to exchange heat with the unit storage containers. Hereinafter, it is described as an example that the thermal fluid line 200 passes through the interiors of the unit storage containers.

The thermal fluid line 200 may have various structures that may exchange heat with the unit storage containers, and the present disclosure is neither limited nor restricted by the structure and the form of the thermal fluid line 200.

Hereinafter, a description is made with reference to the thermal fluid line 200 that passes through the first unit storage container 110 and the second unit storage container 120.

According to an embodiment of the present disclosure, the thermal fluid line 200 may include a first line 210 that pass via the first unit storage container 110, a second line 220 that passes via the second unit storage container 120, and a connection line 230 that continuously connects the first line 210 and the second line 220 (i.e., the first line 210, the connection line 230, and the second line 220 form a continuous line, such that the thermal fluid can continuously flow therethrough).

As structures that are similar to those of the first line 210 and the second line 220, a third line may be provided in the third unit storage container 130, a fourth line may be provided in the fourth unit storage container 140, and a fifth line may be provided in the fifth unit storage container 150. Through a scheme that is similar to that of the connection line 230 that connects the first line 210 and the second line 220, the third to fifth lines may be continuously connected by a medium of other connection lines 230.

The first line 210 may have various structures that may exchange heat with the first unit storage container 110, and the present disclosure is neither limited nor restricted by the structure and the form of the first line 210.

According to an embodiment of the present disclosure, the first line 210 may be provided along a lengthwise direction of the first unit storage container 110, and may be configured to have a helical shape.

In this way, a heat exchange area of the first line 210 may be sufficiently secured by forming the first line 210 in a helical shape that surrounds a circumference of the interior space of the first unit storage container 110.

According to another embodiment of the present disclosure, it is possible to form the first line 210 in a linear shape or other different shapes.

The second line 220 may have various structures that may exchange heat with the second unit storage container 120, and the present disclosure is neither limited nor restricted by the structure and the form of the second line 220.

According to an embodiment of the present disclosure, the second line 220 may be provided along a lengthwise direction of the second unit storage container 120, and may be configured to have a helical shape.

In this way, a heat exchange area of the second line 220 may be sufficiently secured by forming the second line 220 in a helical shape that surrounds a circumference of the interior space of the second unit storage container 120.

According to another embodiment of the present disclosure, it is possible to form the second line 220 in a linear shape or other different shapes.

The connection line 230 may be configured to continuously connect the first line 210 and the second line 220, and may supply the thermal fluid supplied to the first line 210 to the second line 220 via the connection line 230.

The connection line 230 may have various structures that may continuously connect the first line 210 and the second line 220, and the present disclosure is neither limited nor restricted by the structure and the form of the connection line 230.

As an example, the connection line 230 may have a substantially linear shape. According to another embodiment of the present disclosure, it is possible to form the connection line 230 in a curved shape or other different shapes.

In one example, one end (an upper end with reference to FIG. 1) of the connection line 230 may be connected to one end (a right end with reference to FIG. 1) of the first line 210, and another end (a lower end with reference to FIG. 1) of the connection line 230 may be connected to one end (a right end with reference to FIG. 1) of the second line 220, which faces the one end of the first line 210.

In this way, heat may be made to be exchanged by the thermal fluid line over all sections along lengthwise directions of the first unit storage container 110 and the second unit storage container 120, by connecting the connection line 230 to ends of the first line 210 and the second line 220.

According to an embodiment of the present disclosure, the connection line 230 may be disposed along a gravitational direction (the upward/downward direction) "G", and the thermal fluid may flow along the connection line 230 as it naturally drops in the connection line 230 by the gravitational force.

In one example, the connection line 230 may be provided to be perpendicular to a ground surface.

In this way, in an embodiment of the present disclosure, by disposing the connection line 230 along the gravitational direction "G" and causing the thermal fluid to flow due to the gravitational force, a load of a pump that provides a pumping force for flows of the thermal fluid may be minimized and power consumptions due to an operation of the pump may be minimized.

Furthermore, according to an embodiment of the present disclosure, because flows of the thermal fluid (for example, flows of the thermal fluid from the first line or the second line) may be secured even through a separate pump is not provided on the thermal fluid line 200, it is possible to exclude the pump from the thermal fluid line 200. Accordingly, when the pump is excluded, the structure may be simplified and a degree of freedom of design and a spatial utility thereof may be enhanced.

It has been described as an example in the above-described and illustrated embodiment of the present disclosure that the unit storage containers are spaced apart from each other by a specific interval, but according to another embodiment of the present disclosure, the adjacent unit storage containers may be disposed to be adhered to each other.

Figure 3:
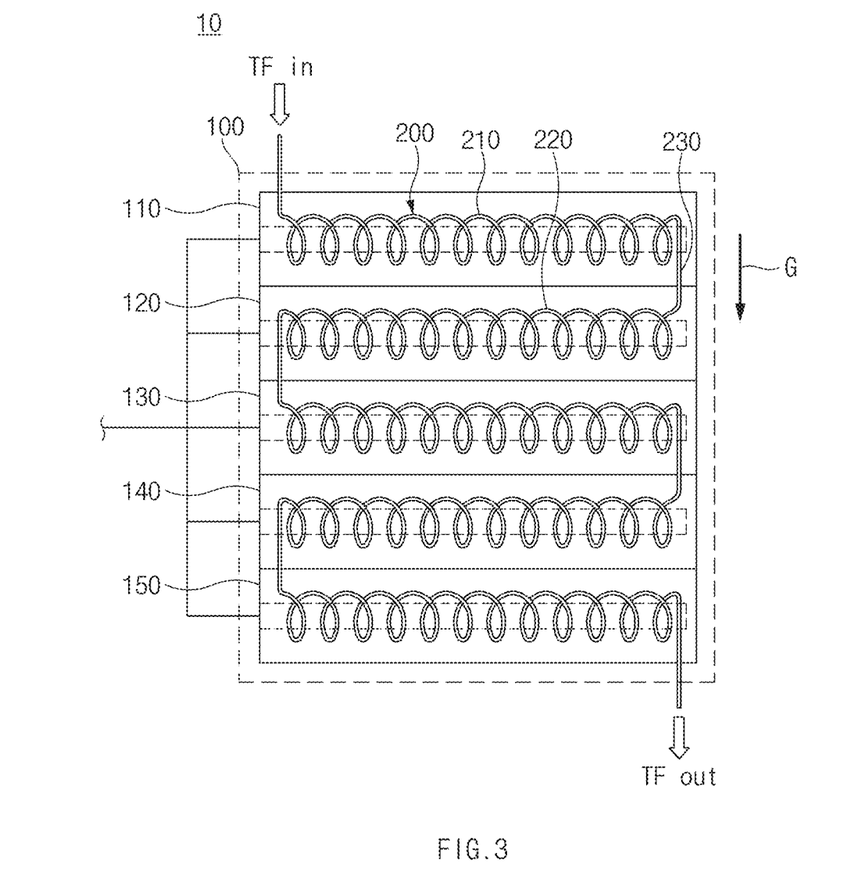
FIGS. 3 and 4 are views illustrating a modification of a hydrogen storage system according to an embodiment of the present disclosure.

Referring to FIG. 3, according to an embodiment of the present disclosure, the first unit storage container 110 and the second unit storage container 120 may be adhered to each other.

In this example, an aspect that the first unit storage container 110 and the second unit storage container 120 are adhered to each other may be understood that an upper side (with reference to FIG. 3) of the second unit storage container 120 is adhered to a lower side of the first unit storage container 110.

In this scheme, the third unit storage container 130, the fourth unit storage container 140, and the fifth unit storage container 150 may be sequentially adhered.

In this way, in an embodiment of the present disclosure, a degree of freedom of design and a spatial utility thereof may be enhanced by adhering the first unit storage container 110 and the second unit storage container 120.

In addition, in an embodiment of the present disclosure, because exposure of the connection line 230 to an outside may be minimized by adhering the first unit storage container 110 and the second unit storage container 120, heat loss and a temperature deviation of the thermal fluid due to exposure of the connection line 230 may be minimized.

It has been described as an example in the above-described and illustrated example of the present disclosure that all of the plurality of unit storage containers 110, 120, 130, 140, and 150 that constitute the storage unit 100 store (or discharge) the hydrogen at the same temperature, but according to another embodiment of the present disclosure, the plurality of unit storage containers 110, 120, 130, 140, and 150 that constitute the storage unit 100 may be configured to store (or discharge) the hydrogen at different temperatures.

According to an embodiment of the present disclosure, the first unit storage container 110 may be configured to store the hydrogen in a first temperature range, and the second unit storage container 120 may be configured to store the hydrogen in a second temperature range that is lower than the first temperature range.

This is caused by an aspect that the thermal fluid supplied to the second unit storage container 120 has a temperature that is lower than that of the thermal fluid supplied to the first unit storage container 110 as the thermal fluid is supplied to the second unit storage container 120 after passing via (exchanging heat with) the first unit storage container 110. Deviations between hydrogen storage performances and efficiencies of the first unit storage container 110 and the second unit storage container 120 may be minimized by causing the second unit storage container 120 to store (or discharge) the hydrogen in the second temperature range that is lower than an operation temperature (the first temperature range) of the first unit storage container 110.

For reference, operation temperatures (temperatures at which the hydrogen is stored or discharged) of the first unit storage container 110 and the second unit storage container 120 may be changed in various schemes according to a condition and a design specification that are required.

As an example, the first metal hydride material is filled in the first unit storage container 110 and the second metal hydride material that is different from the first metal hydride material is filled in the second unit storage container 120 whereby the operation temperatures of the first unit storage container 110 and the second unit storage container 120 may be changed. Alternatively, the operation temperatures of the first unit storage container 110 and the second unit storage container 120 may be changed by changing the sizes or structures of the first unit storage container 110 and the second unit storage container 120.

The first line 210 and the second line 220 that constitute the thermal fluid line 200 may be configured to have the same passage cross-sectional area, but according to an embodiment of the present disclosure, the first line 210 and the second line 220 that constitute the thermal fluid line 200 may be configured to have different passage cross-sectional areas.

In this example, the passage cross-sectional areas of the first line 210 and the second line 220 may be understood as cross-sectional areas (for example, diameters) of the passages (paths) of the first line 210 and the second line 220, through which the thermal fluid flows.

Figure 4:
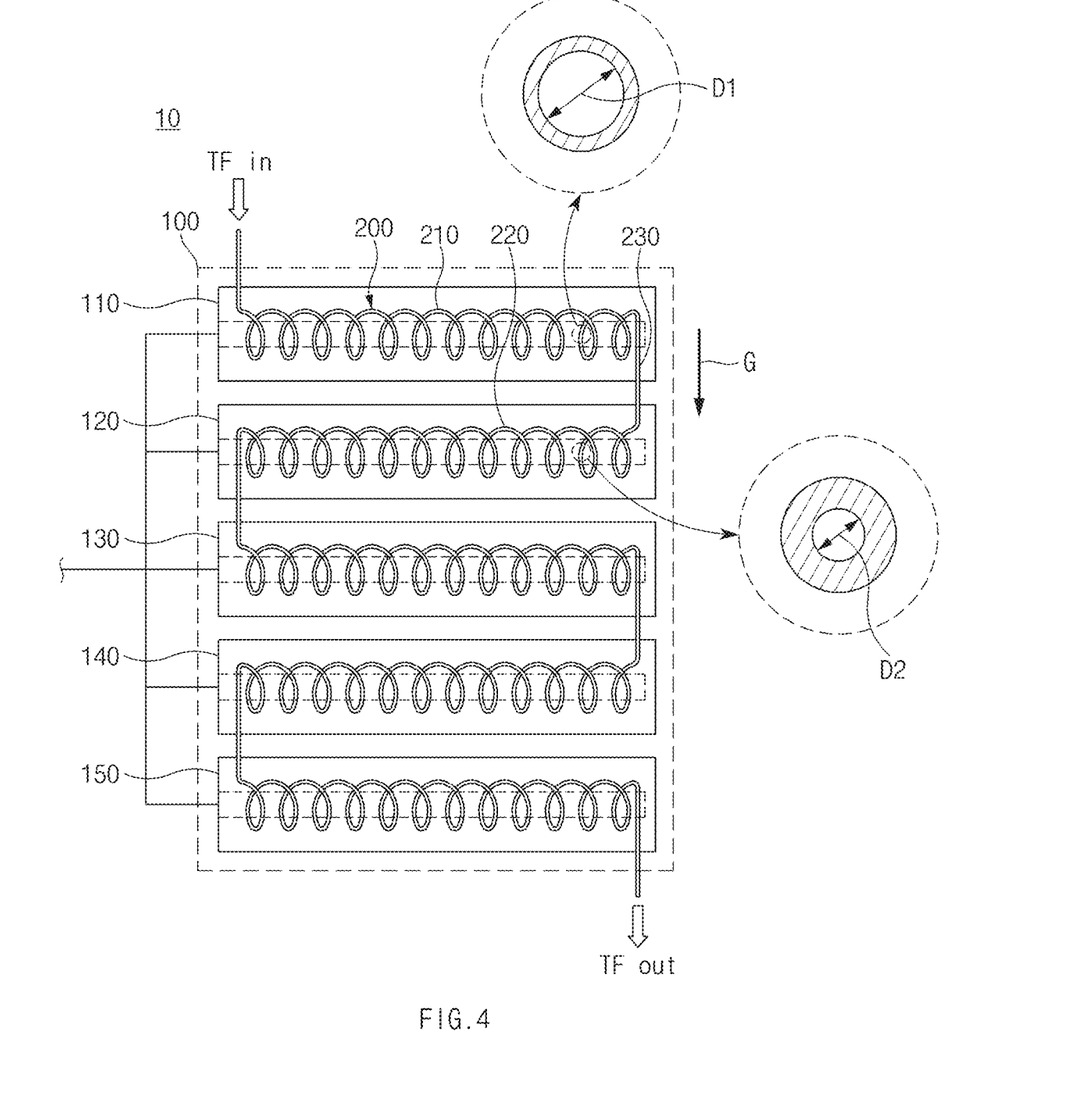

Referring to FIG. 4, according to an embodiment of the present disclosure, the first line 210 may be configured to have a first passage cross-sectional area (for example, a first diameter D1), and the second line 220 may be configured to have a second passage cross-sectional area (for example, a second diameter D2) that is smaller than the first passage cross-sectional area. In a similar scheme, the third line may be formed to have a passage cross-sectional area that is smaller than that of the second line 220, the fourth line may be formed to have a passage cross-sectional area that is smaller than that of the third line, and the fifth line may be formed to have a passage cross-sectional area that is smaller than that of the fourth line.

This is caused by an aspect that the thermal fluid supplied to the second unit storage container 120 has a temperature that is lower than that of the thermal fluid supplied to the first unit storage container 110 as the thermal fluid is supplied to the second unit storage container 120 after passing via (exchanging heat with) the first unit storage container 110. Because a flow velocity of the thermal fluid that passes through the second line 220 may be increased by causing the second line 220 to have the second cross-sectional area (for example, the second diameter D2) that is smaller than the first passage cross-sectional area, the heat exchange effect by the thermal fluid may be enhanced whereby the deviations between the hydrogen storage performances and efficiencies of the first unit storage container 110 and the second unit storage container 120 may be obtained.

Figure 5:
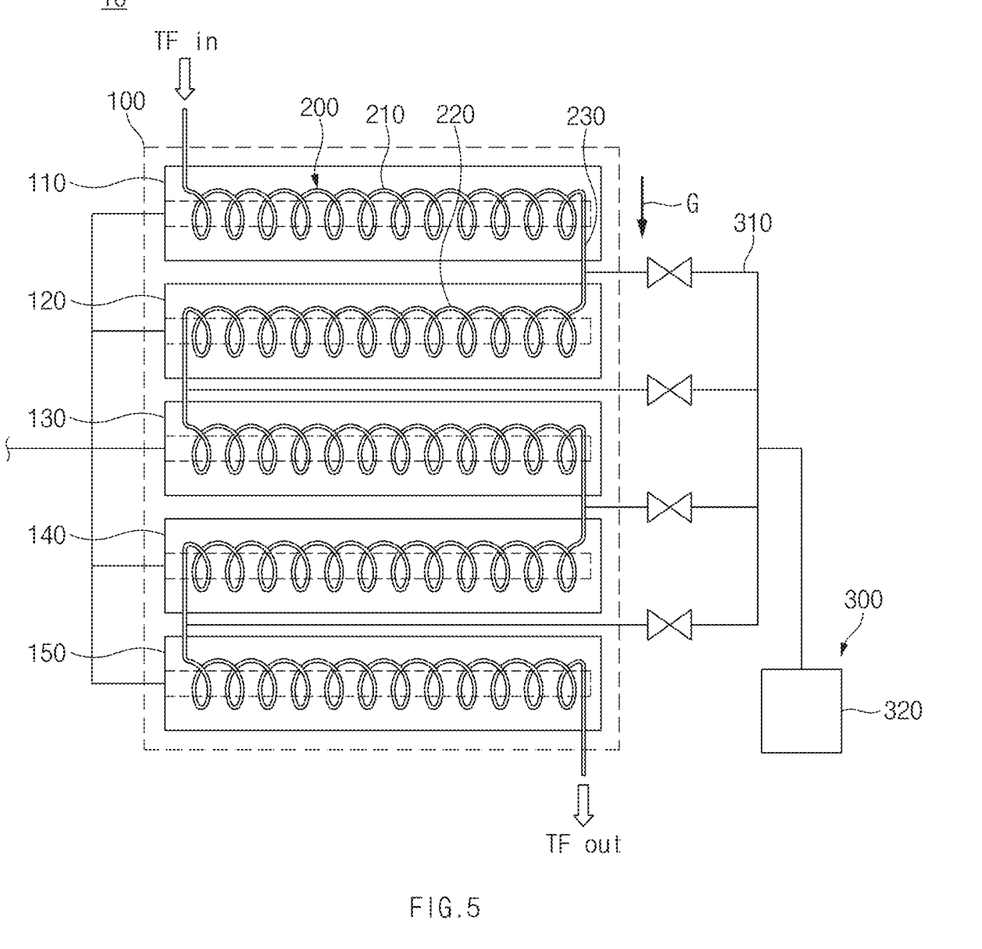
FIG. 5 is a view illustrating a thermal fluid characteristic control part in a hydrogen storage device according to an embodiment of the present disclosure.

Referring to FIG. 5, according to an embodiment of the present disclosure, the hydrogen storage system 10 may include a thermal fluid characteristic control part 300 that is connected to the thermal fluid line 200 and selectively controls at least any one of the temperature and the flow velocity of the thermal fluid.

The thermal fluid characteristic control part 300 may have various structures that may selectively control the temperature and the flow velocity of the thermal fluid that flows along the thermal fluid line 200, and the present disclosure is neither limited nor restricted by the structure of the thermal fluid characteristic control part 300.

According to an embodiment of the present disclosure, the thermal fluid characteristic control part 300 may include a bypass line 310 connected to the connection line 230, and a control part 320 that is provided in the bypass line 310 and controls at least any one of the temperature or the flow velocity of the thermal fluid.

The bypass line 310 may have various structures that connect the connection line 230 and the control part 320, and the present disclosure is neither limited nor restricted by the structure and form of the bypass line 310.

A heater (for example, an electric heater) that may control (raise) a temperature of the thermal fluid that is bypassed to the bypass line 310, a booster (or a pump) that may control (increase) the flow velocity, and the like may be used as the control part 320, and the present disclosure is neither limited nor restricted by the kind and structure of the control part 320.

This is caused by an aspect that the thermal fluid supplied to the second unit storage container 120 has a temperature that is lower than that of the thermal fluid supplied to the first unit storage container 110 as the thermal fluid is supplied to the second unit storage container 120 after passing via (exchanging heat with) the first unit storage container 110. Because a temperature deviation (or a flow velocity deviation) of the thermal fluid supplied to the first unit storage container 110 and the thermal fluid supplied to the second unit storage container 120 may be minimized by causing the thermal fluid that passed through the first unit storage container 110 is supplied to the second unit storage container 120 after being heated by the thermal fluid characteristic control part 300 (or after the flow velocity thereof is increased) whereby deviations between the hydrogen storage performances and the efficiencies of the first unit storage container 110 and the second unit storage container 120 may be minimized.

In this scheme, the thermal fluid that passes through the second unit storage container 120 may be supplied to the third unit storage container 130 after being heated by the thermal fluid characteristic control part 300 (or the flow velocity thereof is increased), the thermal fluid that passes through the third unit storage container 130 may be supplied to the fourth unit storage container 140 after being heated by the thermal fluid characteristic control part 300 (or the flow velocity thereof is increased), and the thermal fluid that passes through the fourth unit storage container 140 may be supplied to the fifth unit storage container 150 after being heated by the thermal fluid characteristic control part 300 (or the flow velocity thereof is increased).

As described above, according to an embodiment, a storage performance and an efficiency of hydrogen of a high capacity may be enhanced while storing the hydrogen in a solid hydrogen storage scheme.

In particular, according to an embodiment of the present disclosure, the storage performance and the efficiency of the hydrogen may be enhanced by connecting a plurality of unit storage containers in parallel.

Furthermore, according to an embodiment of the present disclosure, a load of a pump for supplying a thermal fluid used for heating and cooling the unit storage containers may be minimized and power consumptions may be minimized.

Most of all, according to an embodiment of the present disclosure, the thermal fluid supplied along a thermal fluid line may be caused to drop and flow due to a gravitational force whereby the thermal fluid may be supplied to the unit storage containers while a pumping force by a pump is minimized or excluded.

Furthermore, according to an embodiment of the present disclosure, heat exchange efficiency by the thermal fluid may be enhanced and deviations of temperatures for heating and cooling the unit storage containers may be minimized.

Furthermore, according to an embodiment of the present disclosure, heat loss of the thermal fluid may be minimized, a time period that is consumed for heating and cooling the unit storage containers may be shortened, and energy efficiency may be enhanced.

Although the embodiments have been mainly described, they are simply exemplary and do not limit the present disclosure, and those having ordinary skill in the art to which the present disclosure pertains may understand that various modifications and applications may be made without departing from the essential characteristics of the embodiments. For example, the detailed components of the embodiments may be modified. Further, it is construed that the differences related to the modifications and applications defined in the claims also fall within the scope of the present disclosure.

What is claimed is:

1. A hydrogen storage system comprising:
a storage unit including a plurality of unit storage containers, in which metal hydride materials are respectively provided in an interior thereof and which are connected to each other in parallel; and
a thermal fluid line defining a thermal fluid passage, which passes via the plurality of unit storage containers continuously and through which a thermal fluid flows for heating or cooling the unit storage containers,
wherein the storage unit includes:
a first unit storage container of the plurality of unit storage containers, in which one of the metal hydride materials is accommodated in an interior thereof; and
a second unit storage container of the plurality of unit storage containers, in which another one of the metal hydride materials is accommodated in an interior thereof, wherein the second unit storage container is provided on a lower side of the first unit storage container along a gravitational direction,
wherein the thermal fluid line includes:
a first line configured to pass via the first unit storage container;
a second line configured to pass via the second unit storage container; and
a connection line continuously connecting the first line and the second line,
wherein the connection line is disposed along the gravitational direction, and
wherein the thermal fluid drops and flows due to a gravitational force in the connection line.

2. The hydrogen storage system of claim 1, wherein the first line is provided along a lengthwise direction of the first unit storage container, and has a helical shape, and
wherein the second line is provided along a lengthwise direction of the second unit storage container, and has a helical shape.

3. The hydrogen storage system of claim 1, wherein one end of the connection line is connected to one end of the first line, and another end of the connection line is connected to one end of the second line, which faces the one end of the first line.

4. The hydrogen storage system of claim 1, wherein the first unit storage container and the second unit storage container are adhered to each other.

5. The hydrogen storage system of claim 1, wherein the first unit storage container and the second unit storage container are configured to store hydrogen at different temperatures.

6. The hydrogen storage system of claim 5, wherein the first unit storage container stores the hydrogen in a first temperature range, and the second unit storage container stores the hydrogen in a second temperature range that is lower than the first temperature range.

7. The hydrogen storage system of claim 1, wherein the first line and the second line have different passage cross-sectional areas.

8. The hydrogen storage system of claim 7, wherein the first line has a first passage cross-sectional area, and the second line has a second passage cross-sectional area that is smaller than the first passage cross-sectional area.

9. The hydrogen storage system of claim 1, further comprising:
a thermal fluid characteristic control part connected to the thermal fluid line and configured to selectively control at least any one of a temperature and a flow velocity of the thermal fluid.

10. The hydrogen storage system of claim 9, wherein the thermal fluid characteristic control part includes:
a bypass line connected to the connection line; and a control part provided in the bypass line, and configured to control at least any one of the temperature or the flow velocity of the thermal fluid.

\* \* \* \* \*